Oct. 1, 1968          W. D. LAUGHLIN          3,403,928
STABILIZER AND TENSIONING MEANS FOR TRAILER HITCH
Filed Jan. 3, 1967          2 Sheets-Sheet 1
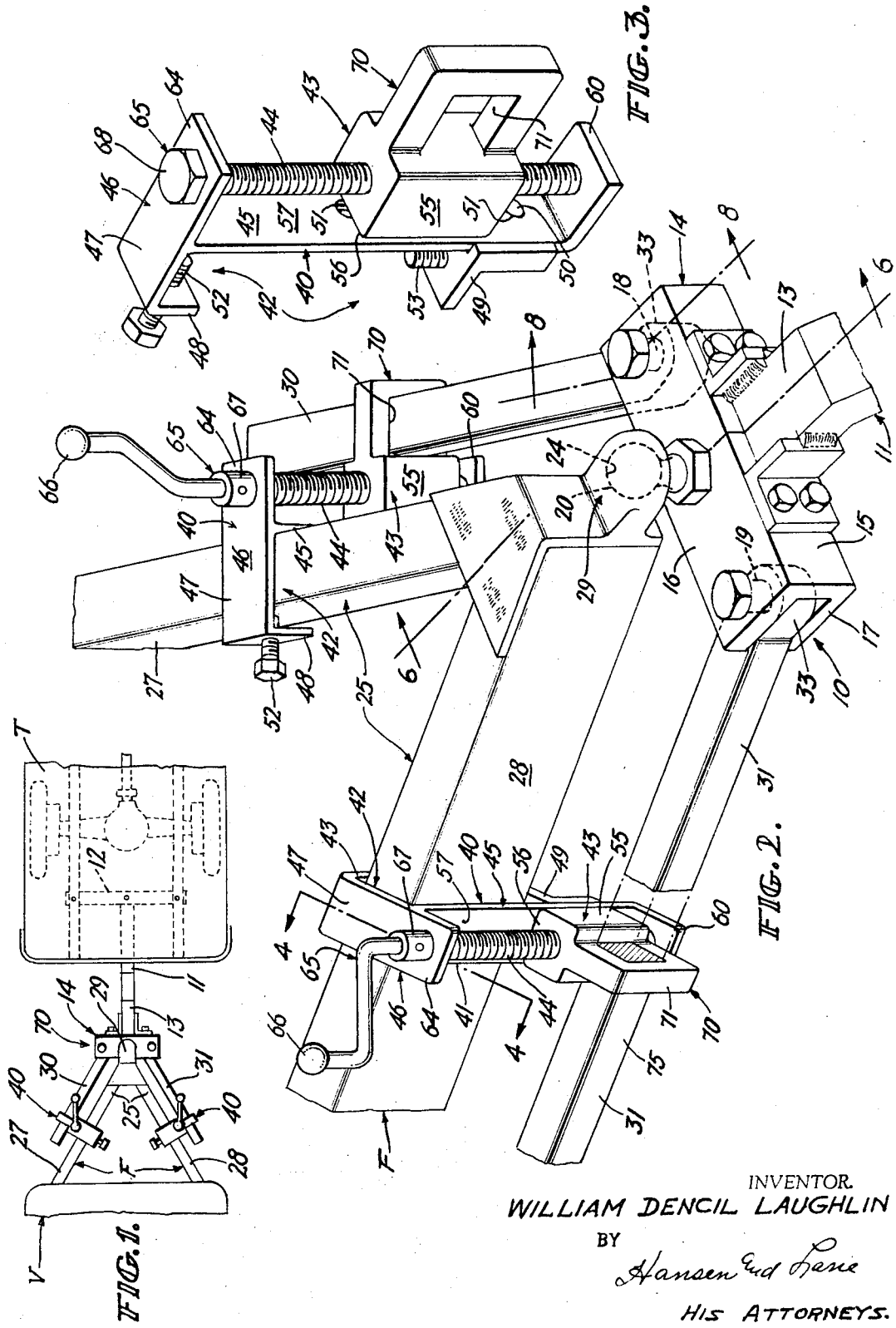
INVENTOR.
WILLIAM DENCIL LAUGHLIN
BY
*Hansen and Lane*
HIS ATTORNEYS.

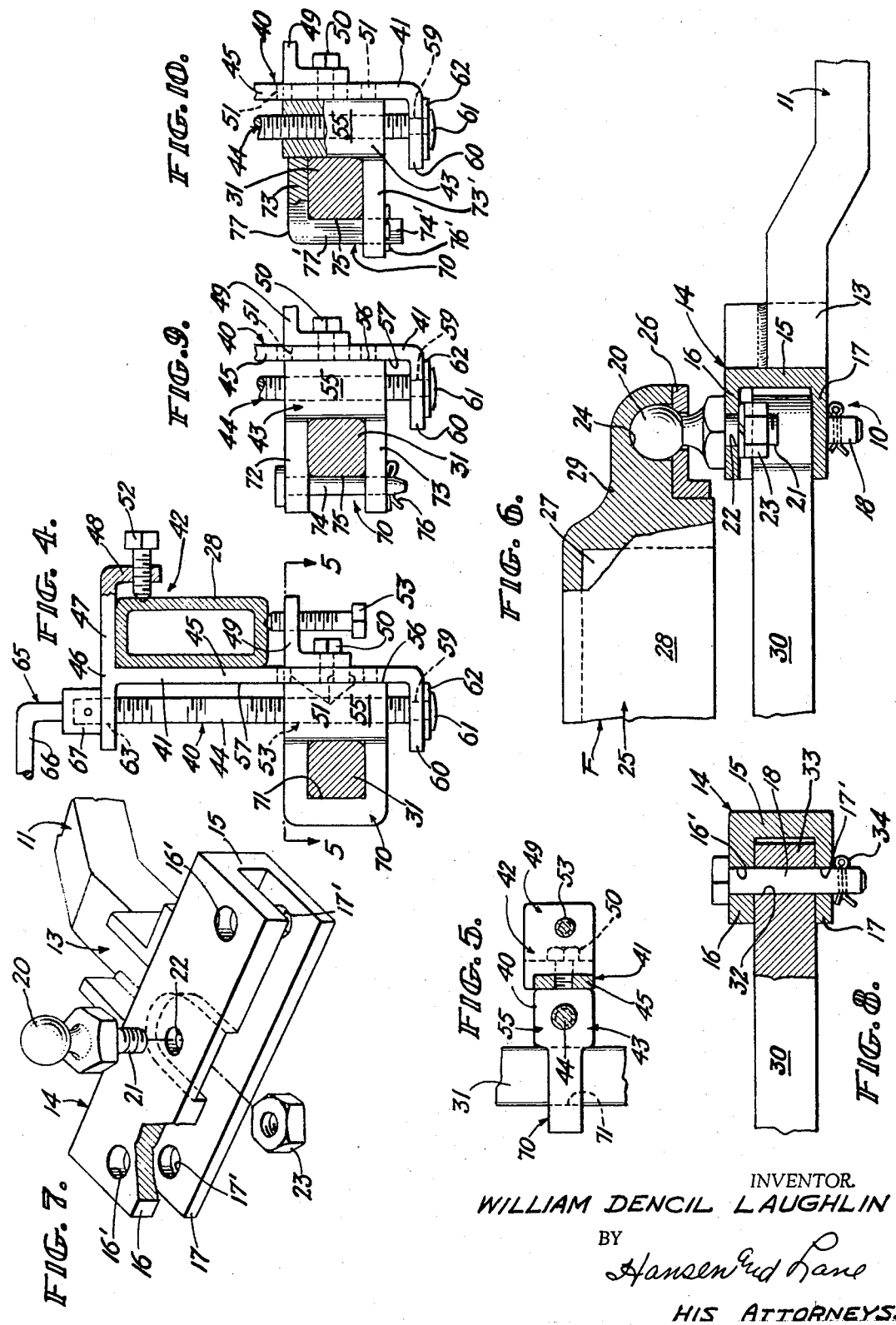

United States Patent Office 3,403,928
Patented Oct. 1, 1968

3,403,928
STABILIZER AND TENSIONING MEANS FOR TRAILER HITCH
William D. Laughlin, 1624 Palm—Space 304,
Windsor, Calif. 95492
Filed Jan. 3, 1967, Ser. No. 606,893
10 Claims. (Cl. 280—406)

ABSTRACT OF THE DISCLOSURE

An apparatus for adjusting the tension between the sway bars and hitch head of a stabilized type sway control for a trailer hitch and comprising a clamp for each side of the V-shaped trailer tongue and which slidably embraces the tongue member for lengthwise adjustment therealong and vertically adjustably supports, by a screw-type elevating means, a yoke for slidably receiving the free end of the sway bar extending along the tongue on said side whereby the sway bar may be selectively adjustably tensioned.

Cross reference to related art

In general the art related to tension adjusting of equalizing hitches includes Patent No. 2,680,626 which covers a chain and slot linkage between the tension bars and trailer frame. Patent No. 3,021,154 shows another form including a strap extending up from the sway bars and provided with vertically aligned spaced holes for receiving bolts of a clevis securable to the trailer frame at desired variable positions. In either of these two disclosures a separate jack is required to support the tension bars during change of length of the chain or the strap relative to the trailer frame.

Brief summary of the invention

The present invention relates to a self-contained tension adjusting device which eliminates the need for supporting or jacking up the tension bars during correction of the tension between the latter and the trailer frame. Briefly, the present invention comprises a pair of clamps, one for each side of the trailer frame and slidable lengthwise thereof together with a rider associated with each tension bar for sliding movement relative thereto and means for raising and lowering such rider for changing the tension between the tension bars and the trailer hitch head from which they extend rearwardly in substantial parallelism with respect to the related sides of the trailer frame.

Brief description of drawing

In the accompanying two sheets of drawings:

FIG. 1 is a fragmentary plan view of a trailer and tractor vehicles showing a stabilizer type trailer hitch embodying the present invention therebetween.

FIG. 2 is an enlarged fragmentary perspective view of a portion of the stabilizer type trailer hitch of FIG. 1 which embodies the present invention.

FIG. 3 is a perspective view of the clamp, rider and elevator therefor forming a part of the present invention.

FIG. 4 is a vertical section through FIG. 2 taken substantially along line 4—4 therein.

FIG. 5 is a horizontal section through FIG. 4 taken along line 5—5 thereof.

FIG. 6 is a vertical section through the hitch head of FIG. 2 and taken along line 6—6 therein.

FIG. 7 is an exploded perspective view of a portion of the hitch head of FIGS. 2 and 6.

FIG. 8 is a vertical section through the connection between one tension bar and the hitch head of FIG. 2 and taken along line 8—8 of the latter.

FIG. 9 is a section through a modified form of the rider shown in FIG. 4.

FIG. 10 is a section through another modification of the form of rider shown in FIGS. 4 and 9.

Detailed description

Referring to FIG. 1 a stabilizer type trailer hitch generally designated 10 includes a draw bar 11 having its fore end suitably connected and secured to a cross brace 12 which is a part of the chassis of the tractor vehicle T. The draw bar 11 which extends rearwardly has an upwardly offset rear portion 13 secured to a coupling head 14 to support the latter at a conventional elevation for a trailer hitch.

The coupling head 14 (FIGS. 2 and 7) is a channel-shaped T-head the base web 15 of which has welded at its center the rear portion 13 of the draw bar 11. The flanges 16 and 17 of the channel-shaped head bar 14 extend rearwardly from the web 15 and each has aligned bores 16'–17' respectively adjacent its ends to receive a shear pin 18 and 19 at each end of the head bar 14.

A conventional trailer hitch ball 20 is secured centrally of the coupling head 14, between its ends and upon the upper surface of the upper flange 16 thereof. The ball 20 has a threaded stud 21 extending downwardly through a central bore 22 in the flange 16 and is secured thereto by a nut 23 inside the channel-shaped head 14.

A trailer hitch socket member 24 secured to the tongue portion 25 of a trailer frame F is mounted on the hitch ball 20 and secured thereto in a detachable keeper 26 in any of the usual manners known in the art.

The tongue portion 25 of the frame F of the trailer vehicle V includes a pair of beam-like side walls 27 and 28 which converge at an apex casting 29 of which the socket member 24 and keeper 26 are a part.

The stabilizer type trailer hitch 10 further includes a pair of lever arms hereinafter referred to as tension bars 30 and 31. Each of these tension bars 30 and 31 being of identical form, like reference numerals identify like parts thereof. Each tension bar 30 and 31 has a bore 32 formed through one end 33 which is of a height to slidingly fit between the upper and lower flanges 16 and 17 of the channel-shaped coupling head 14, (FIG. 8). The bore 32 of each tension bar is identical to the aligned bores 16'–17' in the flanges 16 and 17 and when registered therewith, receives the respective shear pin 18 or 19 as the case may be. Each shear pin has a cotter key 34 inserted through a diametric bore below the lower flange 17 for maintaining the pins in place and the tension bars 30 and 31 pivotally secured to the head bar 14. The tension bars 30 and 31 are thus pivotally mounted for swinging movement in a horizontal plane relative to the head bar 14. Each tension bar 30 and 31 has its after end connected to an adjacent and respective side wall 27 and 28 of the tongue of the trailer frame F. The connection between the tension bars 30 and 31 and the respective side walls 27 and 28 of the trailer frame F is accomplished by a self-contained tension adjusting device 40.

The tensioning adjusting device 40 on each side of the frame F is identical in construction and like reference numerals identify like parts thereof. Each tensioning adjusting device 40 (FIGS. 2, 3 and 4) comprises a main body 41 having a clamp 42 formed on one side thereof and a rider 43 guided for up and down movement on a screw shank 44 on the opposite side thereof.

The main body 41 of each device 40 preferably has a flat strap member 45 adapted to lie flat against the outer face of a side wall 27 or 28 of the trailer frame. The upper end of the strap member 45 has an integral T-head 46, one end 47 of which overlies and rests upon the upper surface of the frame side wall 27 or 28 as the case may be. This one end 47 of the head 46 forms one jaw of a C-clamp 42 and has a depending terminal end 48 spaced sufficiently from the strap member 45 to receive and embrace the width of the particular side wall 27 or 28 to which it is applied. The opposite jaw of the clamp 42 is provided by an angle clip 49 secured to the inner face of the strap member 45 by bolt 50 threaded into one or another vertically spaced tapped bore 51 in the strap member to accommodate the depth dimension of the particular trailer frame side wall to which the clamp is applied.

Each of the clamp jaw members is provided with a set screw disposed to engage the frame side wall embraced by the clamp. The set screw 52 is the upper jaw extends horizontally through the depending terminal end 48 thereof while the set screw 53 in the lower jaw extends vertically upward through the angle clip 49. By this arrangement each tension adjusting device 40 is firmly secured to a respective side wall 27 or 28 of the trailer frame at any desired position along the length thereof. In this manner the length of leverage provided by the tension bars 30 and 31 can be changed relative to the pivoted ends thereof on the channel-shaped coupling 14 of the trailer hitch 10.

The after end of each tension bar 30 and 31 is secured to the rider 43 of the tension adjusting device 40 mounted on the adjacent side wall 27 and 28, respectively, of the trailer frame F.

The rider 43 comprises a solid block 55 having a flat back face 56 disposed to engage the outer face 57 of the flat strap member 45 for up and down movement adjacent and along the same. This solid block 55 has a vertical bore 58 threaded and mounted on the screw shank 44. The screw shank 44 has a reduced shank 59 extending through a bore in an outwardly extending lateral flange 60 on the bottom of the strap member 45. The lower end 61 of the reduced shank 59 is peened over a washer 62 bearing against the under side of the flange 60 to maintain the screw shank 44 in relatively stationary condition for rotation only on the clamp member. The upper end of the screw shank 44 has an unthreaded portion 63 extending through a bore in the outwardly extending end 64 of the integral T-head 46 of the clamp 42.

Any suitable key member 65 facilitating turning of the screw shank 44 may be applied to the upper end 63 of the latter. In FIGS. 1, 2 and 4 such key member 65 consists of a crank 66 the boss 67 of which is secured to the upper end 63 of the shank 44. An alternative form of such key member 65 is shown as a hex head 68 in FIG. 3 wherein any suitable tool such as a wrench (not shown) applied to the head 68 facilitates turning of the screw shank 44.

The rider 43 includes a yoke 70 within which the after end of a particular tension bar 30 or 31 can extend and be secured. In FIGS. 2, 3, 4 and 5 the yoke 70 is shown to be a closed loop 71 formed integrally with and on the outer face of the solid block portion 55 of the rider 43. The loop 71 is preferably shaped to conform to the shape (cross sectionally) of the tension bar 30 or 31. Sufficient clearance is provided between the loop and bar to permit sliding movement of the yoke lengthwise the bar and a slight canting or biasing of the bar 30 or 31 when the latter is urged out of parallelism relative to the side wall 27 or 28 as the case may be.

A modified form of yoke 70 is disclosed in FIG. 9 as a pair of upper and lower flanges 72 and 73 formed integrally with the solid block 55 and extending outwardly therefrom to receive and embrace the after end of a tension bar 30 and 31. A shear pin 74 extending through aligned bores in the flanges 72 and 73 and bearing against the outer face 75 of the particular tension bar serves to hold the latter within the yoke thus formed. A cotter pin 76 through the lower end of the shear pin 74 maintains the latter in place.

A further modification of the yoke 70 is shown in FIG. 10 as but a single lower flange 73' and an angle clip 77 having a horizontal flange 72' disposed above the tension bar and a vertical flange 77' embracing the outer face 75 of the bar (30 or 31); the flange 77' having a pin 74' formed thereon extending through a bore in the lower flange 73' and secured in place by a cotter pin 76'.

*Operation*

The draw bar 11 is first properly secured to the chassis of the pulling vehicle T and the ball socket 24 on the apex end of the tongue 25 of the trailer V properly seated, connected and secured to the ball 20 on the coupling head 14 of the hitch 10. At this time the tongue end 25 of the trailer should be supported on blocks or the like in a horizontal position.

The tension bars 30 and 31 are then substantially parallel to the side walls 27 and 28 of the trailer frame F and can be swung horizontally into alignment with the yoke 70.

The tension adjusting devices 40 are then placed upon the respective side wall members 27 and 28 of the trailer frame F and the clamp portions 42 slid longitudinally thereof as the after ends of the respective tension bars 30 and 31 are inserted into the respective yokes 70. The clamps 42 are then secured to the side wall members 27 and 28 at the desired positions along the length of the latter, after which turning of the screw shanks 44 effects a lever action upon the tension bars 30 and 31 and into the coupling head 14 at the aft end of the draw bar 11.

When the screw shanks 44 are turned to elevate the riders 43, an upward thrust is exerted on the aft ends of the tension bars drawing them toward the level of the side walls 27 and 28. This upward thrust on the aft ends of the tension bars effects a leverage, lifting their forward pivotal ends within the channel-shaped coupling head 14. This exerts an upward torque to the coupling head for aligning the trailer tongue with the draw bar 11 thereby transmitting the load of the fore end of the trailer frame more directly to the draw bar and to the chassis of the pulling vehicle T. Any further adjustment of the tension upon the tension bars can now be accomplished by merely turning the screw shanks 44, no jacks or supports under the trailer tongue being required.

While I have described my new anti-sway hitch for trailers in specific detail it will be appreciated by those skilled in the art that the device may be modified, altered and/or varied without departing from the spirit of my invention therein. I therefore desire to avail my self of all modifications, alterations and/or variations as may fairly come within the purview of the appended claims.

What I claim as new and desire to protect by Letters Patent is:

1. In a trailer hitch including a draw bar having its fore end attached to a draft vehicle and its after end provided with a coupling head and a ball hitch intermediate the ends of such coupling head disposed for hitched relation to a trailer hitch socket formed at the fore end of the side walls of the tongue of a trailer frame:

a stabilizer and tensioning means therefor comprising in combination:
   a channel at each end of said coupling head open to the after side and ends thereof,
   a pair of tension bars each having its fore end disposed to fit within the channel at a respective end of said coupling head,
   a shear pin for pivotally connecting the fore end of each of said tension bars within the channel end of said coupling head for swinging movement in a horizontal plane only, and
   a tension adjusting device between the after end of each of said tension bars and an adjacent side wall of said trailer frame tongue comprising:
      a clamp movable lengthwise of the side wall of the trailer frame tongue to which it is attached to engage the after end of a respective tension bar at a desired leverage length from said coupling head, a screw shank journaled on the outer side of said clamp for turning about a vertical axis, and a yoke embracing the after end of the tension bar adjacent the respective side wall of said trailer frame tongue and arranged for up and down movement on said screw shank upon turning of the latter for imparting a lever action to said tension bar and into said coupling head for aligning said trailer frame tongue with said draw bar.

2. The device in accordance with claim 1 in which said clamps consist of a flat strap having a pair of laterally extending vertically spaced flanges on its outer side providing said journal for said screw shank and in which said screw shank has means formed thereon facilitating manual turning of said screw shank.

3. The device in accordance with claim 2 in which said yoke has a block body portion threadedly mounted on said screw shank and means on said block body portion engaging the flat strap portion of said clamp for resisting turning of said block body and yoke and for guiding the latter for up and down movement upon turning of said screw shank.

4. The device in accordance with claim 3 in which said yoke comprises a loop formed integrally with said block body portion and for sliding fit upon the after end of one of said tension bars.

5. The device in accordance with claim 3 in which said yoke comprises a pair of upper and lower flanges formed integrally with said block body portion and extending outwardly therefrom to receive and embrace the after end of one of said tension bars.

6. The device in accordance with claim 5 including a shear pin extending through aligned bores formed in said upper and lower flanges with said shear pin bearing against the outer face of the tension bar within said yoke for holding the latter against the outer face of the block body portion of said yoke.

7. The device in accordance with claim 3 in which said yoke comprises a lower flange formed integrally with said body portion and extending outwardly therefrom for engaging and supporting the lower surface of one of said tension bars, an angle clip having a horizontal flange overlying the upper surface of such tension bar and a vertical flange engaging the outer side of such tension bar, a stud pin on the lower end of the vertical flange of said angle clip extending through a bore formed in said lower flange of said yoke, and means for securing said stud pin relative to said lower flange.

8. The device in accordance with claim 1 in which each of said clamps comprises a flat strap body adapted to lie flat against the outer face of a side wall of said trailer frame tongue, a T-head formed integrally with the upper end of said flat strap body and having one end disposed to rest upon the upper surface of said side wall and extending inwardly therefrom to provide an upper jaw for said clamp, a depending terminal end on said one end of said T-head and a set screw threaded through the depending terminal end of said upper jaw for engaging said side wall and for drawing said flat strap body firmly against the outer side wall of said trailer frame tongue, an angle clip providing a lower jaw for said clamp, said flat strap having a plurality of vertically spaced tapped bores formed through the lower half thereof, said angle clip having a bore formed through one flange thereof, bolt means extending through the bore in said one flange of said angle clip and threadable into one or another of said tapped bores in said flat strap for securing said angle clip thereto with its other flange disposed in spaced proximity to the lower surface of said side wall, and a set screw threaded through said other flange of said angle clip for engaging the adjacent lower surface of said side wall for securing the lower jaw of said clamp thereto.

9. The device in accordance with claim 8 in which the other end of the T-head on said flat strap has a bore formed therethrough, a laterally and inwardly extending flange formed integrally with and on the inner face of said flat strap and having a bore formed therethrough in axial alignment with the bore formed in said other end of the T-head of said flat strap, for providing upper and lower flange journals for said screw shank, said screw shank having a reduced lower end extending through the bore in said lower flange journal and having its extreme end peened to maintain said screw shank in said upper and lower flange journals and in parallel spaced relation to the outer face of said flap strap, and means on said yoke engaging the outer face of said flat strap for resisting turning of said yoke during turning of said screw shank.

10. The device in accordance with claim 9 in which said yoke has a block body portion threadedly mounted on said screw shank, said block body portion having a flat back face arranged for sliding movement in flush relation to the outer face of said flat strap.

References Cited

UNITED STATES PATENTS

| | | | |
|---|---|---|---|
| 2,597,657 | 5/1952 | Mathisen | 280—406 |
| 2,789,834 | 4/1957 | Chism | 280—406 |
| 2,863,673 | 12/1958 | Lisota | 280—406 |
| 3,129,957 | 4/1964 | Bernard et al. | 280—406 |
| 3,347,561 | 10/1967 | Hedgepeth | 280—406 |
| 3,353,842 | 11/1967 | Lewis | 280—406 X |

LEO FRIAGLIA, *Primary Examiner.*